(12) United States Patent
Jakobsen

(10) Patent No.: US 6,874,367 B2
(45) Date of Patent: Apr. 5, 2005

(54) PRESSURE SENSOR

(75) Inventor: Henrik Jakobsen, Horten (NO)

(73) Assignee: Sensonor ASA, Horten (NO)

( * ) Notice: Subject to any disclaimer, the term of this patent is extended or adjusted under 35 U.S.C. 154(b) by 0 days.

(21) Appl. No.: 10/385,283

(22) Filed: Mar. 10, 2003

(65) Prior Publication Data
US 2003/0205090 A1 Nov. 6, 2003

(30) Foreign Application Priority Data
May 1, 2002 (EP) .............................. 02253102

(51) Int. Cl.⁷ .............................................. G01L 9/12
(52) U.S. Cl. ....................... 73/718; 73/715; 361/283.4
(58) Field of Search ................ 73/700–756; 361/283.1, 361/283.4, 283.2, 283.3

(56) References Cited

U.S. PATENT DOCUMENTS

| 4,388,668 A | * | 6/1983 | Bell et al. ................. 361/283.4 |
| 4,390,925 A | | 6/1983 | Freud |
| 4,426,673 A | * | 1/1984 | Bell et al. ................. 361/283.4 |
| 4,609,966 A | * | 9/1986 | Kuisma .................... 361/283.1 |
| 4,730,496 A | | 3/1988 | Knecht et al. |
| 4,872,945 A | | 10/1989 | Myers et al. |
| 4,996,627 A | * | 2/1991 | Zias et al. ................. 361/283.4 |
| 5,113,868 A | * | 5/1992 | Wise et al. ................. 600/488 |
| 5,174,156 A | * | 12/1992 | Johnson et al. ............... 73/715 |
| 5,679,902 A | * | 10/1997 | Ryhanen ......................... 73/78 |
| 5,756,899 A | * | 5/1998 | Ugai et al. .................... 73/714 |
| 5,792,958 A | * | 8/1998 | Speldrich ...................... 73/727 |
| 6,109,113 A | * | 8/2000 | Chavan et al. ................ 73/718 |
| 6,192,761 B1 | | 2/2001 | Sekimori et al. |
| 6,287,256 B1 | * | 9/2001 | Park et al. .................... 600/398 |
| 6,470,754 B1 | * | 10/2002 | Gianchandani ............... 73/718 |

FOREIGN PATENT DOCUMENTS

| DE | 4207952 | | 4/1993 | |
| DE | 19931773 | | 11/2000 | |
| JP | 06066658 A | * | 3/1994 | ............. G01L/9/12 |
| JP | 07167725 A | * | 7/1995 | ............. G01L/9/12 |

* cited by examiner

Primary Examiner—Edward Lefkowitz
Assistant Examiner—Jermaine Jenkins
(74) Attorney, Agent, or Firm—Boyle, Fredrickson, Newholm, Stein & Gratz, S.C.

(57) ABSTRACT

A capacitive-type pressure sensor comprising a glass plate having an electrode formed thereon. A diaphragm is formed from a semiconductor material and bonded to the glass substrate to define an enclosed cavity containing at least a portion of the electrode, to thereby define a capacitive element, through which, in use, an electrical signal may be passed to determine a capacitance thereof which is indicative of the pressure to be determined.

13 Claims, 10 Drawing Sheets (e)

(f)

(g)

PRESSURE SENSOR

Pressure sensors are extensively used in a large and increasingly varied field, including important areas such as medical instrumentation, automotive applications such as engine control and tyre pressure monitoring, industrial process control and the avionics industry. The most commonly used conversion principles for silicon based pressure sensors are capacitive detection and piezoresistive detection.

Piezoresistive sensors are generally considered to be more robust than capacitive sensors. Another advantage is that they give an output signal proportional to the input with good linearity. Capacitive sensors, on the other hand, have the advantage over the piezoresistive type in that they consume less power, but have a non-linear direct output signal and are more sensitive to electromagnetic interference. Capacitive silicon sensors can be made to be small in size and can easily be made by surface micromachining. However, they are not very robust and their pressure sensitive diaphragm needs to be protected against the pressure media by a gel or other flexible material in most applications. This results in an increase in vibration sensitivity due to the mass added to the top of the diaphragm. Advanced and well proven methods of manufacturing silicon pressure sensors and inertial sensors are described in the patent publications EP-A-742581 and EP-A-994330.

The present invention seeks to provide a capacitive silicon sensor arrangement for the measurement of pressure that overcomes the above mentioned problems.

According to the present invention there is provided a capacitive-type pressure sensor comprising:

a glass plate having an electrode formed thereon; and a diaphragm formed from a semiconductor material and bonded to the glass substrate to define an enclosed cavity containing at least a portion of the electrode, to thereby define a capacitive element, through which, in use, an electrical signal may be passed to determine a capacitance thereof which is indicative of the pressure to be determined.

The sensor has a pressure sensitive diaphragm acting as the movable electrode in the capacitor, an on-chip vacuum reference volume preferably sealed by anodic bonding acting as the gap in the capacitor and with the counter electrode of the capacitor on glass. These are connected to the outside of the sealed cavity by a conduction system consisting of metal interconnects on the glass, press contacts between the metal on glass and metal on the silicon part; and with buried conductors in the silicon substrate for crossing of the hermetically sealed cavity to metal interconnects and wire bonding areas outside the sealed area. The invention results in a robust and reliable pressure sensor with good media compatibility. The process technology that is used results in low manufacturing cost which is beneficial for high volume applications such as in the automotive industry.

Higher measurement accuracy can be achieved by incorporating a second and matching capacitor on the same chip as the pressure sensitive capacitor and measuring the relative differences in the two capacitance values. The high accuracy is obtained by the good matching and tracking of the zero-point over temperature and time of the two capacitors values due to the near identical effects of packaging stress on the two capacitors.

This invention is made possible by using silicon planar processing combined with modern silicon bulk micromachining processes such as dry etching, an isotropic and selective etching, thin-film metallization of glass and anodic bonding, all well known within microsystem technology (MST) and micro-electro-mechanical systems (MEMS).

For a good understanding of the invention and its features and advantages, reference is made to the drawings, in which.

Figure 1:
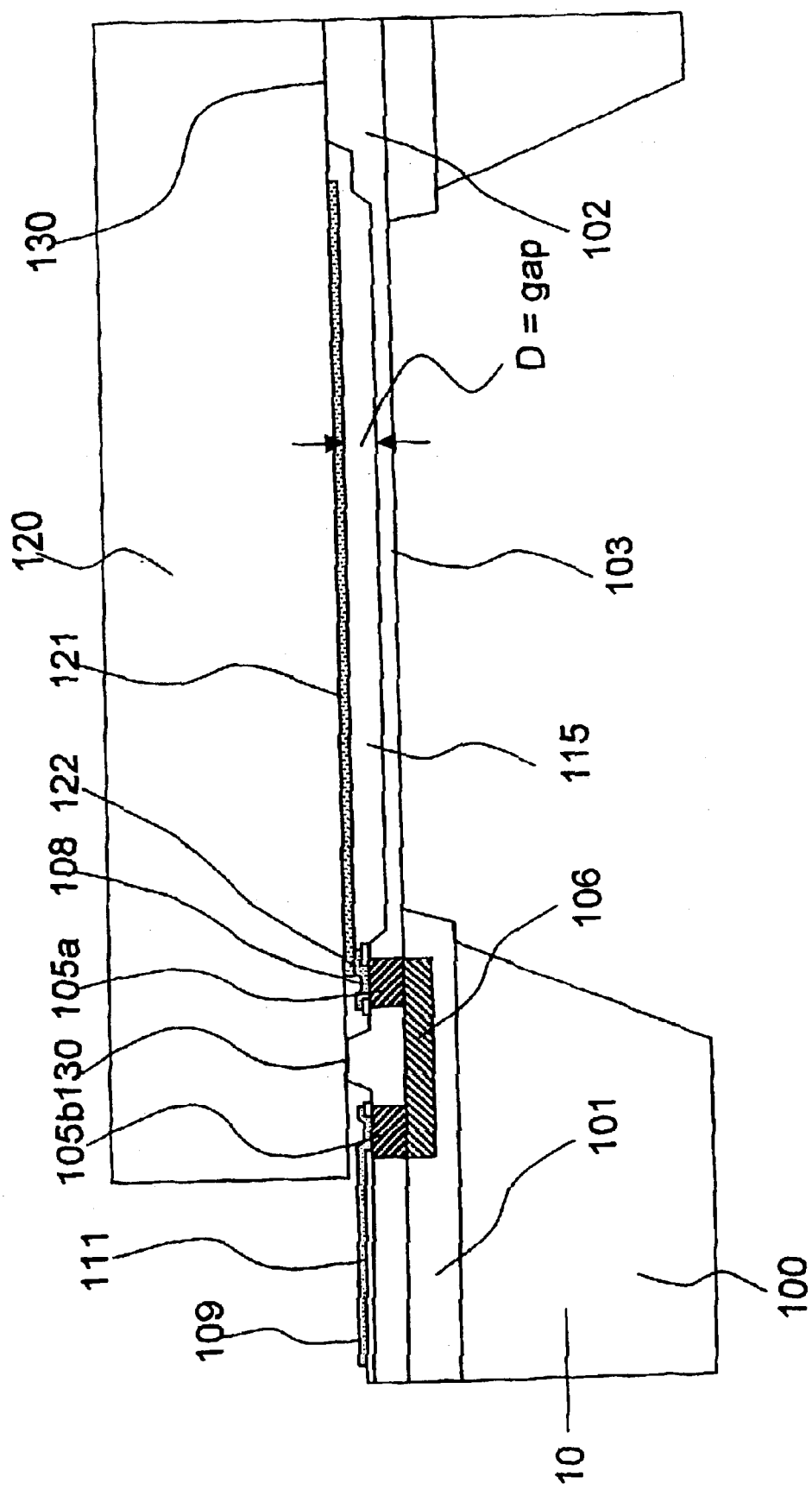
FIG. 1 is a cross sectional view of a first type of a capacitive absolute pressure sensor in accordance with the present invention.
Figure 2:
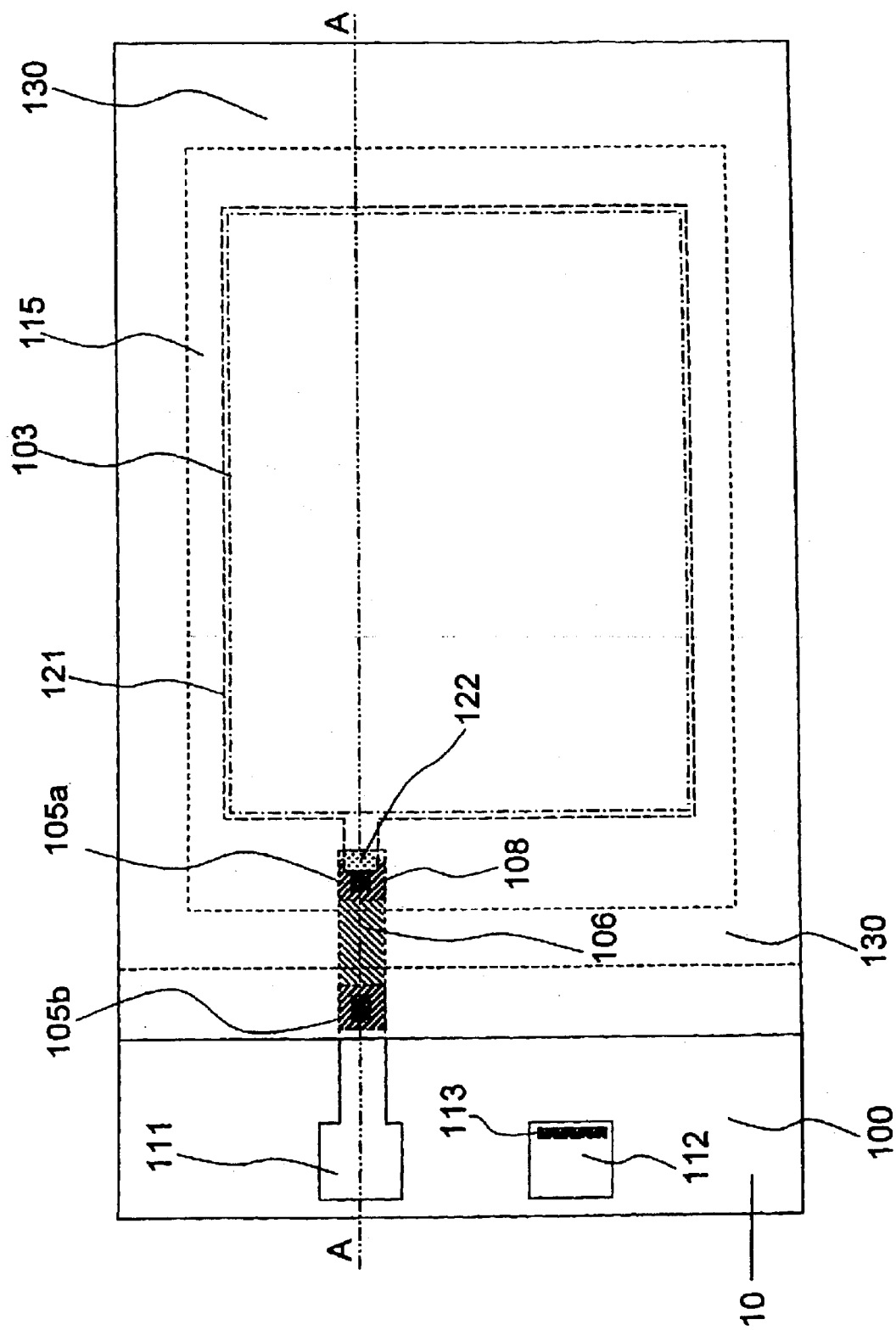
FIG. 2 is a top plan view of the pressure sensor of FIG. 1, the cross sectional view of FIG. 1 being through the line A—A.

A sensing device according to the invention is shown in FIGS. 1 and 2.

The sensor has a silicon part 10, formed on a substrate 100 with a rigid support rim 101, and a surface layer as part of the rim 101 of a first conduction type and a thin flexible diaphragm 103. The silicon substrate 10 contains an electrical conduction system comprising doped conductors 106 of a second conduction type buried under an epitaxial layer 102 of a first conduction type and metal interconnects 108 and 109. The buried conductors 106 and the metal interconnects 108 and 109 are electrically connected to each other via plug diffusions 105a and 105b of a second conduction type and through contact holes formed in a surface passivation layer 111. A recess is etched in the silicon part in an area extending across the diaphragm.

A first glass part 120 has a thin-film surface conduction system 121 on its surface formed by metal interconnects and forming a plate electrode facing the silicon diaphragm 103. The glass 120 is anodically bonded to the silicon part 10 thereby forming a complete seal ring 130. The etched recess in the silicon part forms a sealed vacuum reference volume 115.

The substrate 10 and the glass part 120 form a capacitive sensing device with the metal layer 121, on the glass 120, acting as the first electrode. This electrode is electrically connected to a wire bonding pad 109, that is outside of the sealed cavity, via a press contact formed between the electrode 121, the interconnect 108 and the buried conductor 106 under the sealed area 130. The sealed cavity 115 acts as the electrical isolation gap in the capacitor. The flexible diaphragm 103 is the second electrode of the variable capacitor, electrically connected via the surface layer 101 to a wire bond pad 112 outside the sealed cavity (not shown in FIG. 1).

The sensing function is provided by an increase in capacitance when a pressure acts on the diaphragm 103 to press the diaphragm in the direction towards the counter electrode 121 on the glass, giving a smaller gap 115 in the capacitor.

Figure 3:
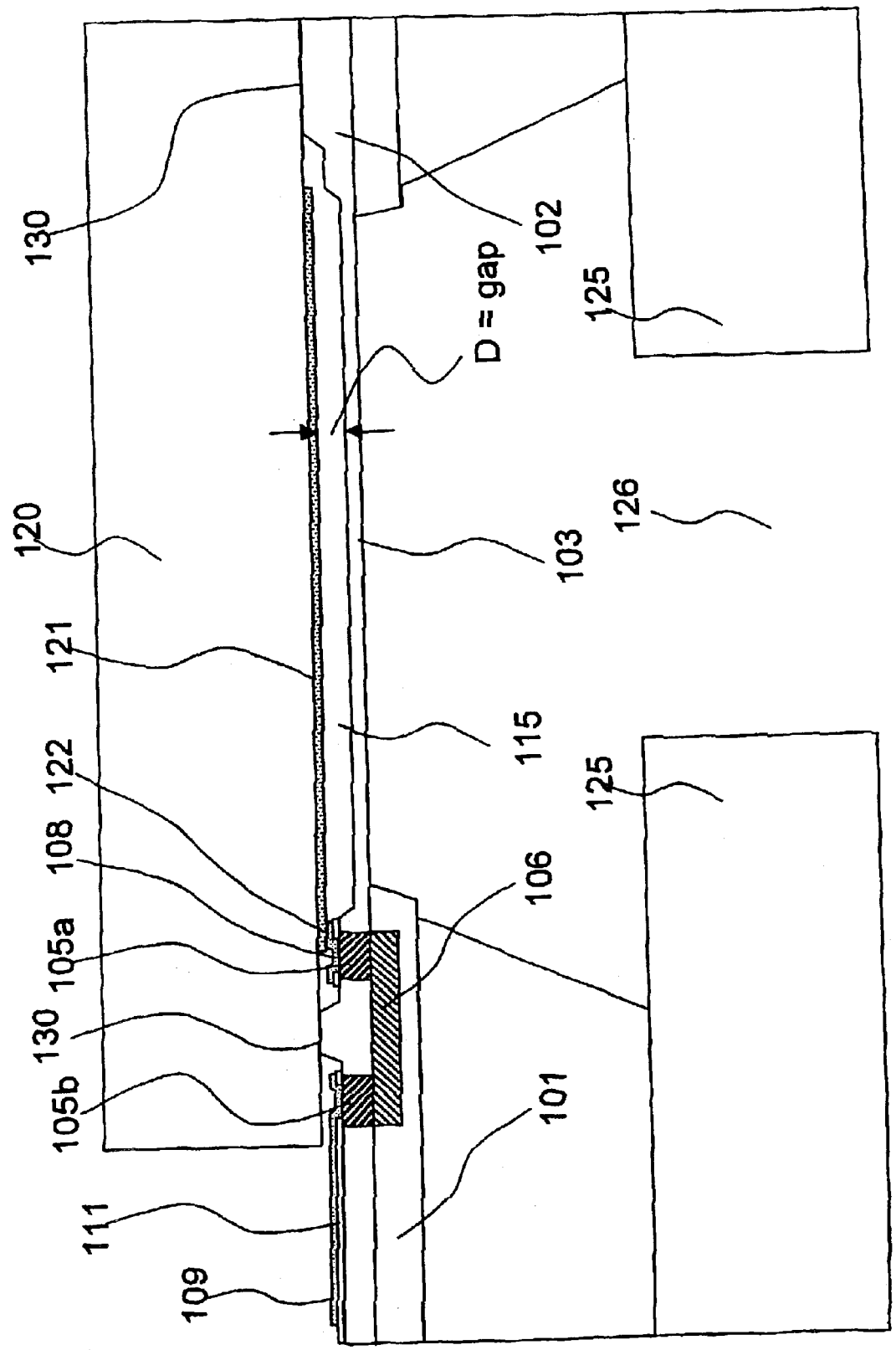
FIG. 3 is a cross-sectional view of the sensor of FIG. 1, but with a second glass layer for improved mechanical stability and with a pressure inlet port through a first glass layer.

Preferably, as shown in FIG. 3, a second glass substrate 125, with a hole 126, is bonded to the silicon substrate with a seal 127. The bonding may be performed, for example, by anodic bonding.

Figure 4:
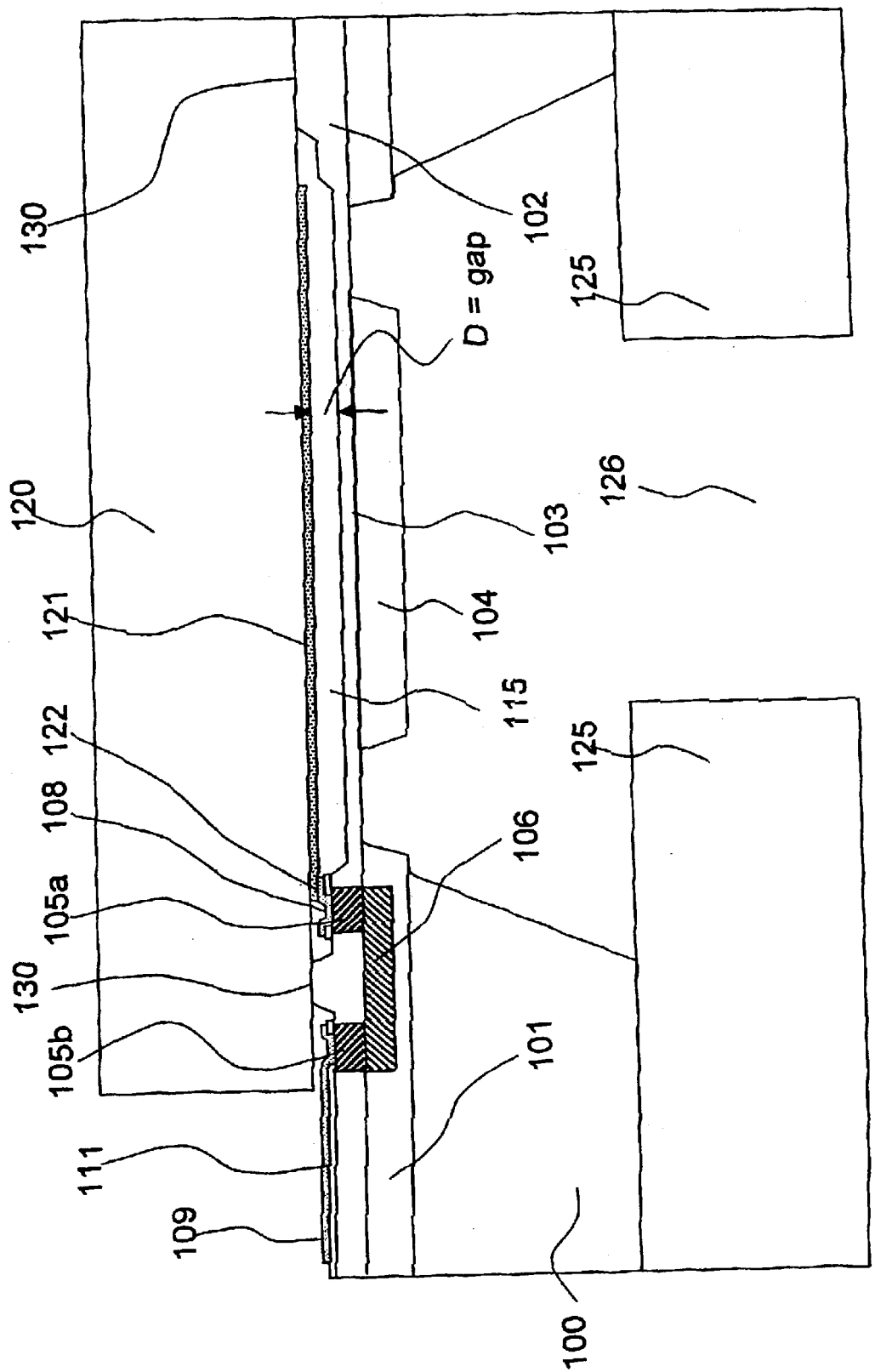
FIG. 4 shows the example of FIG. 3 with a bossed centre section for the diaphragm for a more piston type movement of the diaphragm when exposed to pressure.

The sensing device may modified as shown in FIG. 4 with a centre boss structure 104 to stiffen the centre part of the silicon diaphragm.

Figure 5:
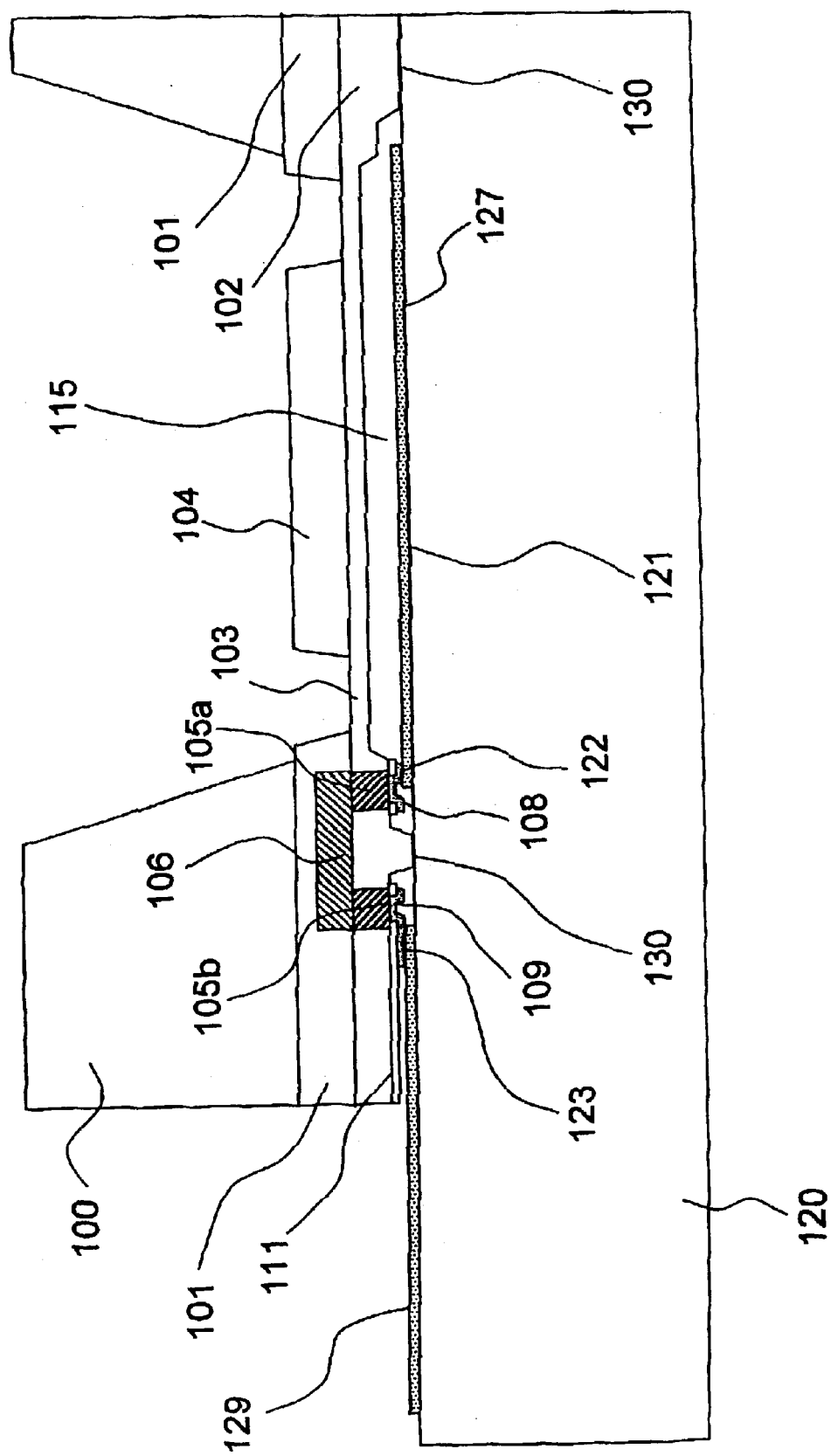
FIG. 5 is a cross sectional view of a second type of a capacitive pressure sensor in accordance with the present invention and having electrical interconnections on its glass layer.
Figure 6:
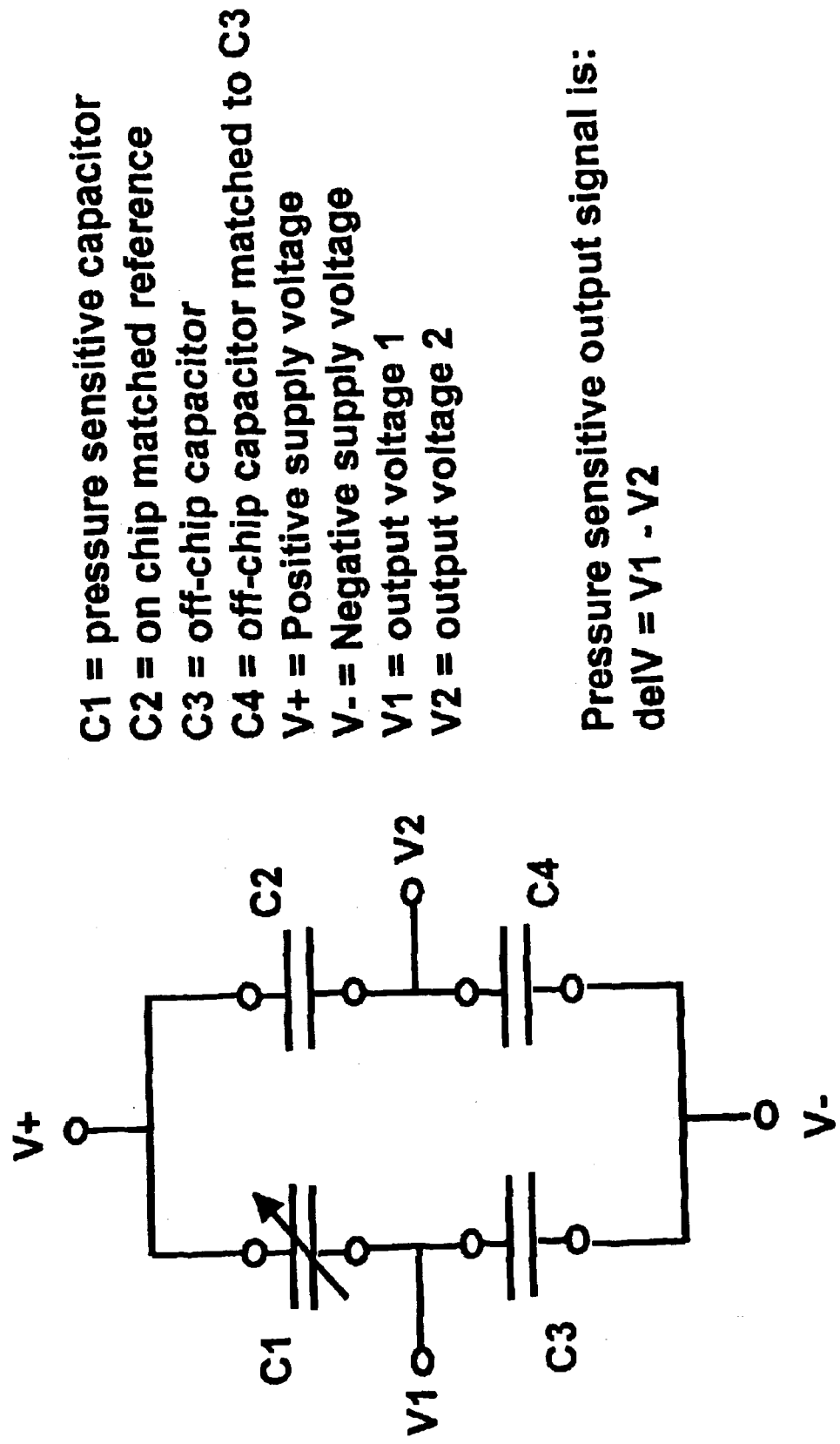
FIG. 6 shows a capacitive measurement bridge, that can be used in a high accuracy version of the invention, using two matched capacitors.

The sensing device may be modified as shown in FIG. 5 with wire bond pads 129 on the glass 120 and additional press contacts 123 between interconnects on glass and the silicon part.

In the above examples pressure sensors with one capacitor have been shown. For applications that will require high total measurement accuracy, including low long term drift it is possible to adapt the above devices.

Figure 7:
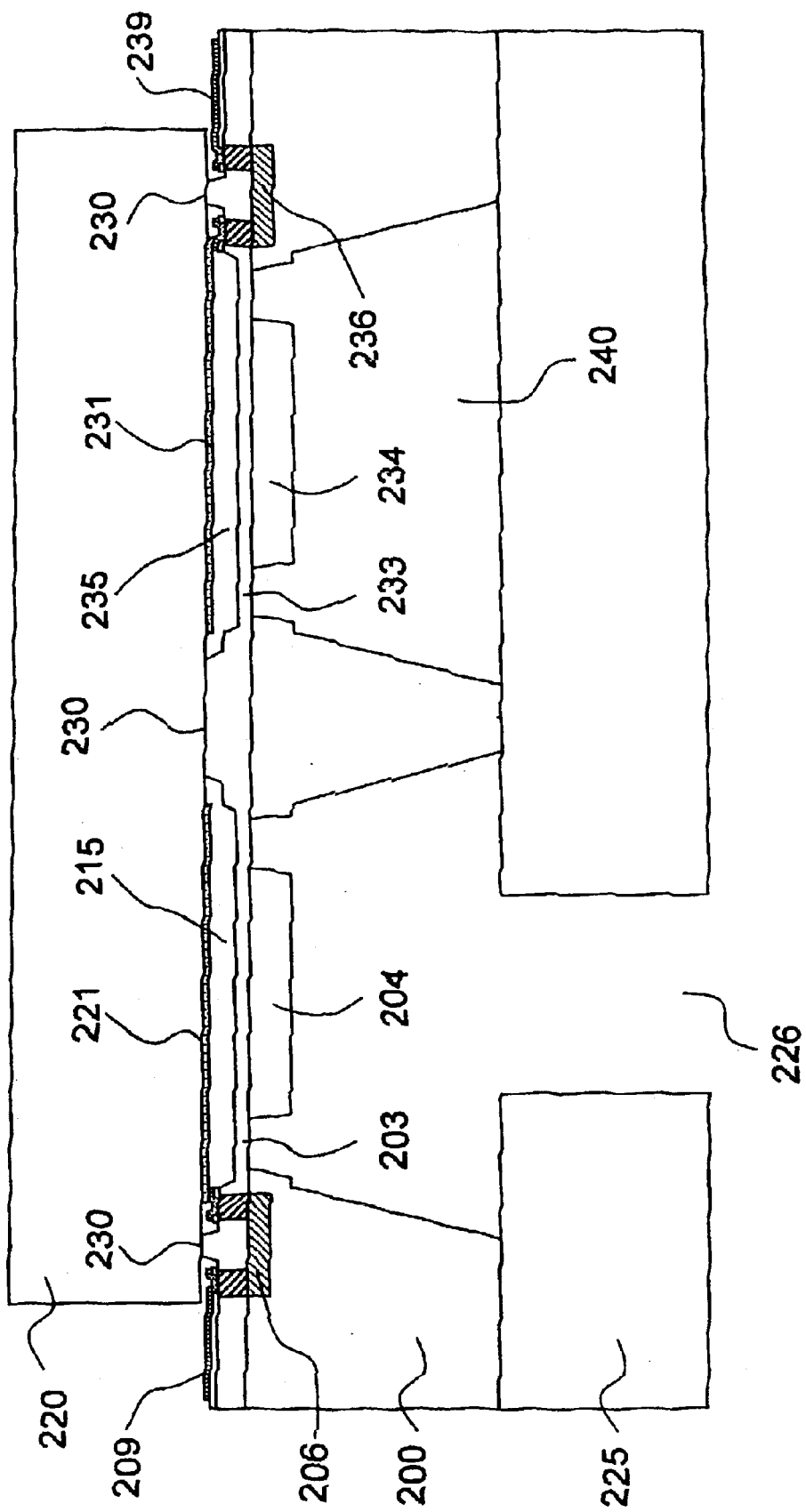
FIG. 7 is a cross-sectional view of a chip with two matched capacitors according to the invention, one of which has a pressure inlet and the other of which is sealed and used as a matched reference.

A sensing device built as two capacitors is shown in FIG. 7. In this device, one of the capacitors is made, according to the description above, as a pressure sensitive capacitor and the other capacitor is identical except that it is not pressure sensitive as it does not have a pressure inlet. Consequently, no pressure difference is experienced over the diaphragm 233. The two capacitors are otherwise identical in order to achieve the best possible match of their capacitance values when no pressure is applied.

Figure 8:
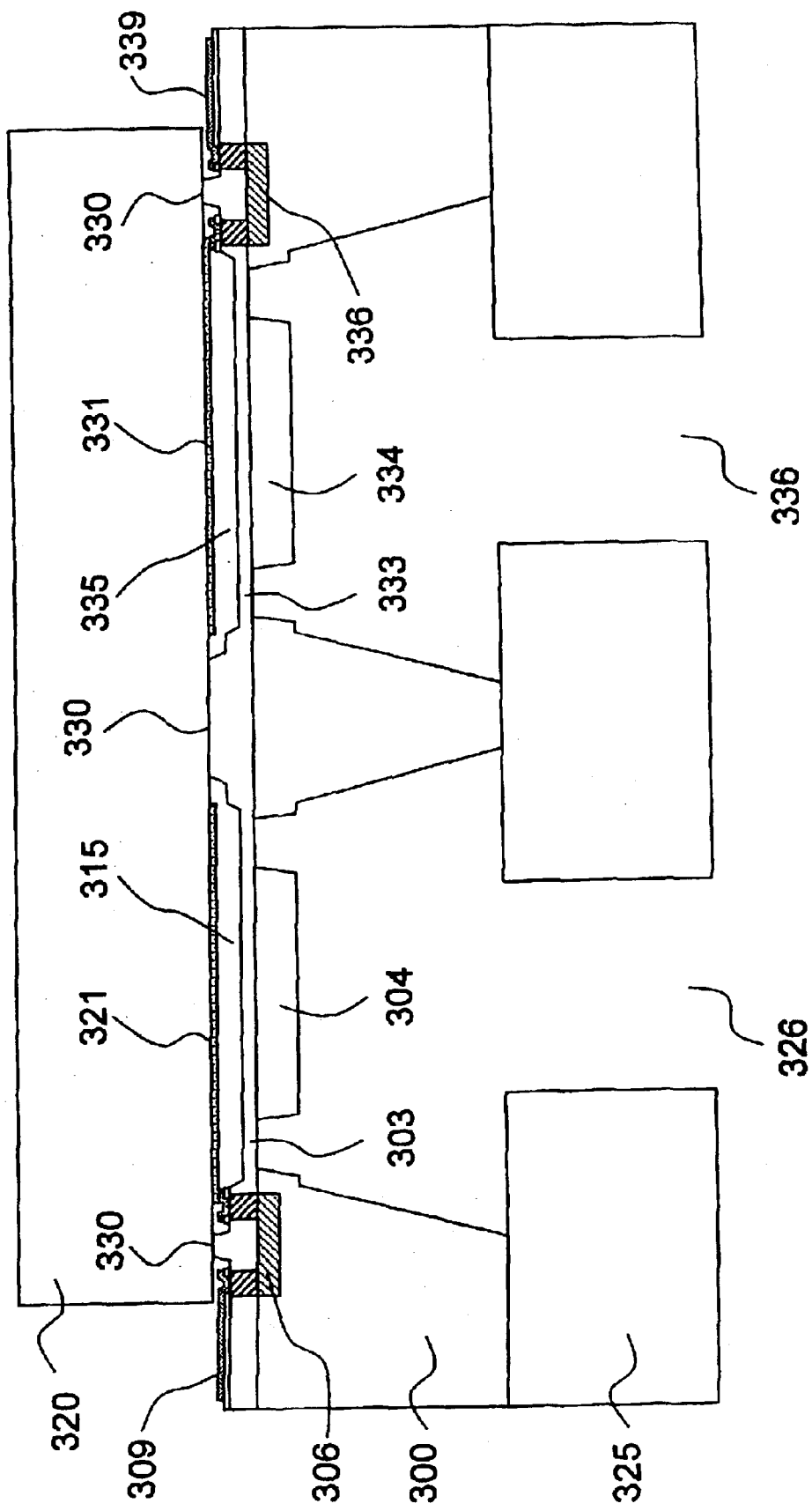
FIG. 8 is a differential measurement device according to the invention.

The sensing device can be built as a differential pressure sensor, as shown in FIG. 8, with two inlets 326, 336 and a common vacuum reference volume 315, 335.

Figure 9:
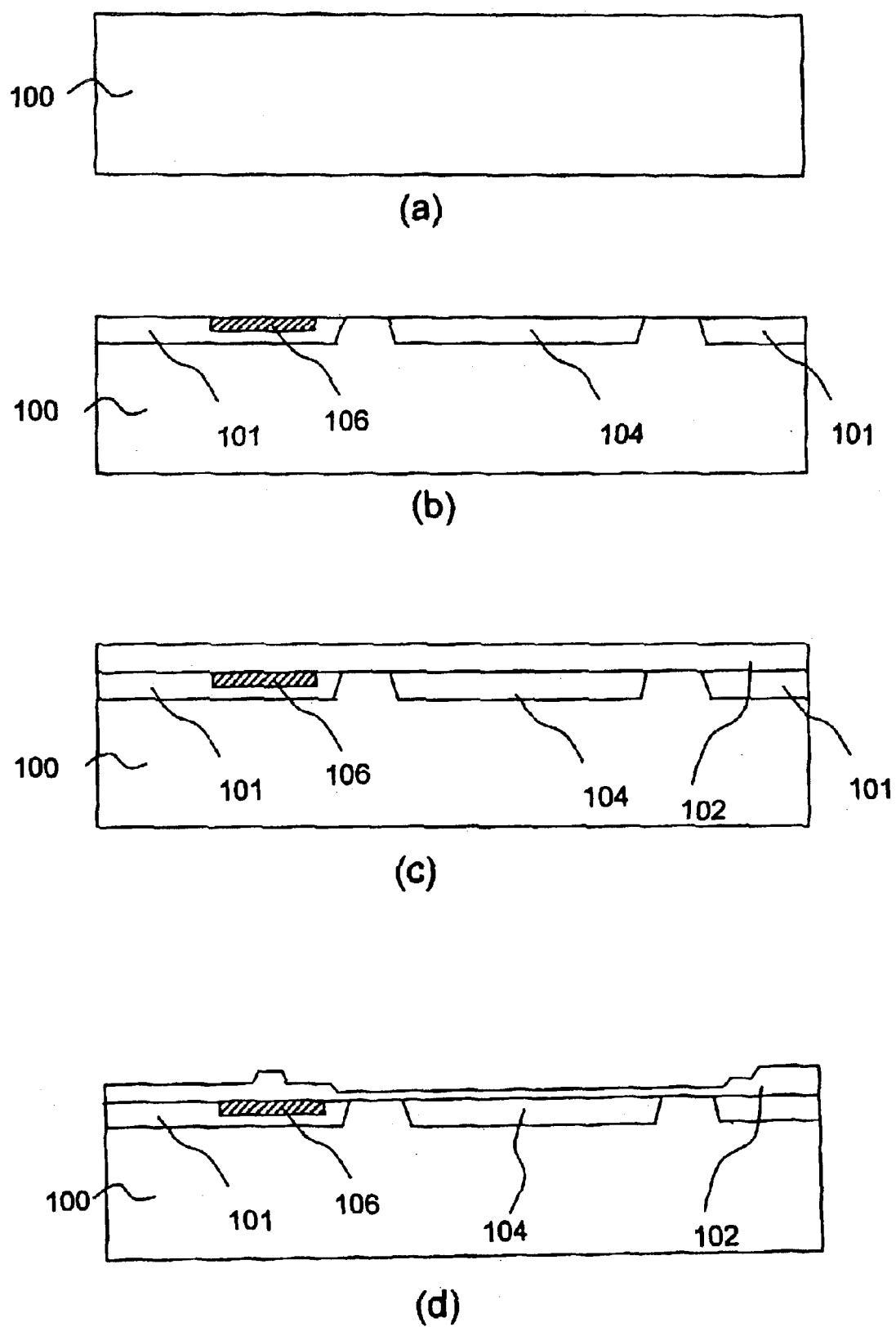
FIG. 9 is a process sequence that can be used to form the sensor shown in FIG. 4.
Figure 9:
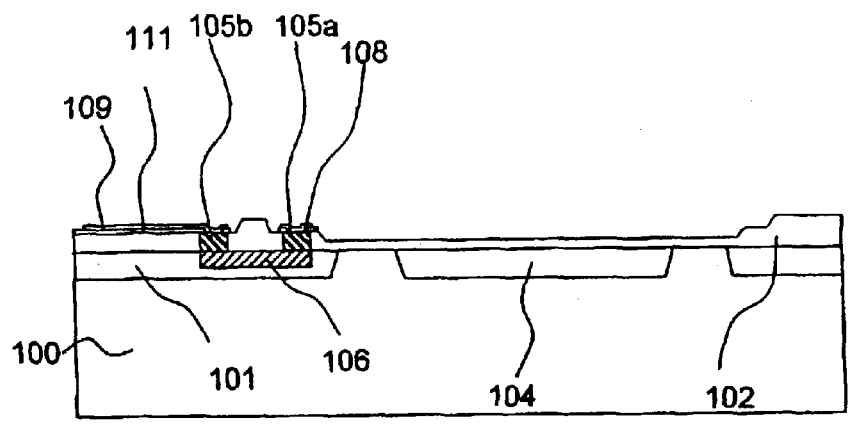
Figure 9:
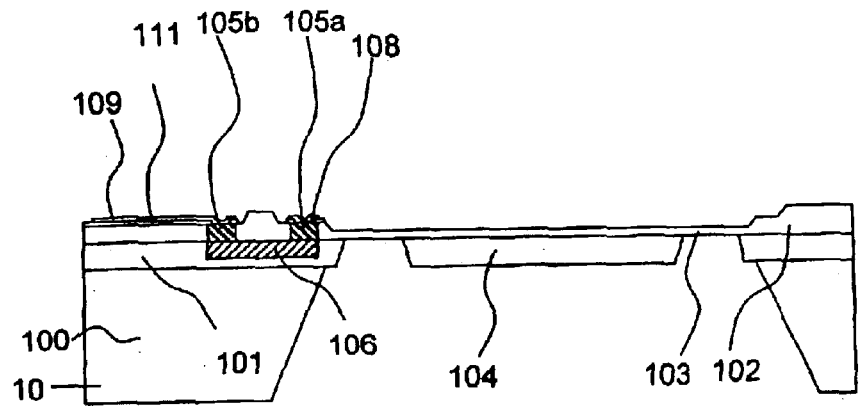
Figure 9:
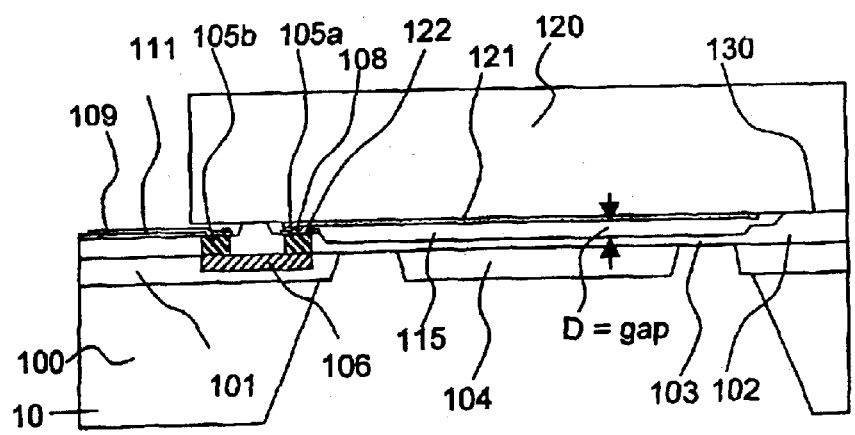

FIG. 9 illustrates a sequence of the manufacturing process of a device according to the present invention (as illustrated in FIG. 4). It can be seen that the simplicity of the sequence lends itself to an uncomplicated, and consequently low cost, manufacturing process.

In this example, the processing starts with a p-type silicon substrate 100 with <1-0-0> orientation, (see FIG. 9a). Standard lithographic methods, ion implantation and high temperature diffusion of n-type doping such as Phosphorous is used to form n-regions 101 and 104 in the substrate, see FIG. 9b. The next step is forming p-type regions 106 by implantation and drive-in diffusion of boron. An n-type epitaxial layer 102 is thereafter grown on top of the silicon substrate to form buried p-regions 106, (see FIG. 9c). Recesses are then etched on the surface 102 by dry etching and/or wet etching as shown in FIG. 9d. In this figure two etching steps have been performed, one to form the distance for the press contacts 108 that will be formed later as shown in FIG. 9e; the other to form the gap in the capacitor. (see FIG. 9g notation D). Contact diffusion regions 105a and 105b, formed from boron, are hereafter made at each end of the buried conductor 106. Contact holes are then formed in a passivation layer 111 and followed by formation of metal interconnect and wire bonding areas 109, as shown in FIG. 9e, using a metal such as aluminum. An isotropic and selective etching, using an etch mask on the opposite side of the substrate is thereafter performed as shown in FIG. 9f. The electrochemical etching extends to the pn-junctions between the substrate 100 and the n-regions 101, 104 and the n-type epitaxial layer 102. A pressure sensitive diaphragm is now formed with thin flexible areas formed as part of the epitaxial layer 102 and with a stiff centre section 101b.

Manufacture of this sensing device is completed by anodically bonding, in a vacuum, a glass substrate 120 with metal electrode and thin film interconnects 121 already formed thereon, to the silicon substrate 100, resulting in a structure as shown in FIGS. 9g and 4, with the anodic bonded seal area 130 and the sealed cavity 115 formed by the recesses etched in the surface of the silicon substrate.

What is claimed is:

1. A capacitive-type pressure sensor comprising:

a glass substrate having an electrode formed thereon;

a diaphragm formed from a semiconductor material and bonded to the glass substrate to define an enclosed cavity containing at least a portion of the electrode, to thereby define a capacitive element, through which, in use, an electrical signal is passed to determine a capacitance thereof which is indicative of the pressure to be determined;

wherein press contacts are located external to the cavity to allow for interaction with devices interconnected with the press contacts; and wherein an electrical connector is provided tbr each of the electrode and the diaphragm, wherein the electrical connector for the electrode is provided by doped conductors being formed within the semiconductor material.

2. A pressure sensor according to claim 1, wherein the diaphragm is formed by micro-machining the semiconductor material.

3. A pressure sensor according to claim 1, wherein the semiconductor material is silicon.

4. A pressure sensor according to claim 1, wherein the semiconductor material comprises a rigid support rim.

5. A pressure sensor according to claim 1, wherein the electrical connector for the diaphragm is provided by the semiconductor material.

6. A pressure sensor according to claim 1, wherein a seal between the glass substrate and the semiconductor material is provided by anodic bonding.

7. A pressure sensor according to claim 1, wherein a second glass substrate with a hole forming a pressure inlet port, in use, is bonded to the semiconductor material such that a layer of semiconductor material is sandwiched between two layers of glass substrate.

8. A pressure sensor according to claim 1, wherein the diaphragm includes a stiff centre boss.

9. A pressure sensor system comprising at least two capacitive-type pressure sensors according to claim 1.

10. A pressure sensor system according to claim 9, wherein the diaphragm of each of the pressure sensors, is formed from a single section of semiconductor material.

11. A pressure sensor system according to claim 9, wherein each of the pressure sensors shares the same glass plate.

12. A pressure sensor system according to claim 9, wherein each pressure sensor is provided with a pressure inlet port, such that the system is a differential pressure sensor device.

13. A pressure sensor system according to claim 9, wherein a first one of the pressure sensors is not provided with a pressure inlet port, such that the first pressure sensor is used as a reference sensor.

* * * * *

UNITED STATES PATENT AND TRADEMARK OFFICE
CERTIFICATE OF CORRECTION

PATENT NO. : 6,874,367 B2 Page 1 of 1
APPLICATION NO. : 10/385283
DATED : April 5, 2005
INVENTOR(S) : Henrik Jakobsen It is certified that error appears in the above-identified patent and that said Letters Patent is hereby corrected as shown below:

CLAIM 1, column 4, line 19, delete "tbr" and substitute therefore -- for --.

Signed and Sealed this

Fifteenth Day of May, 2007

JON W. DUDAS
*Director of the United States Patent and Trademark Office*